United States Patent [19]

Tominaga et al.

[11] Patent Number: 4,733,716
[45] Date of Patent: Mar. 29, 1988

[54] BUSHING IN CONTINUOUS CASTING DIP FORMING APPARATUS

[75] Inventors: Haruo Tominaga, Sakura; Teruyuji Takayama, Chiba; Tetsuo Yamaguchi, Yokohama, all of Japan

[73] Assignee: Fujikura Ltd., Tokyo, Japan

[21] Appl. No.: 921,870

[22] Filed: Oct. 22, 1986

Related U.S. Application Data

[63] Continuation of Ser. No. 736,617, May 21, 1985, abandoned.

[30] Foreign Application Priority Data

May 30, 1984 [JP] Japan .................. 59-110126
Jun. 11, 1984 [JP] Japan ............... 59-86244[U]

[51] Int. Cl.⁴ .............................................. B22D 11/00
[52] U.S. Cl. ................................ 164/418; 164/423; 164/461; 72/467; 118/405
[58] Field of Search ............... 164/461, 462, 476, 423, 164/418, 419, 423, 441; 72/467, 274; 427/431, 329; 118/405, 420, DIG. 18, DIG. 19

[56] References Cited

U.S. PATENT DOCUMENTS

| | | | |
|---|---|---|---|
| 2,808,805 | 10/1957 | Tester | 118/DIG. 18 |
| 3,440,862 | 4/1969 | Phillips | 72/467 |
| 3,469,436 | 9/1969 | Czyorgak | 72/467 |
| 3,526,115 | 9/1970 | Armstrong | 72/467 |
| 3,813,260 | 5/1974 | Lipstein | 118/405 |
| 3,896,870 | 7/1975 | Massoubre | 164/423 |
| 3,924,036 | 12/1975 | Carrara | 164/461 |
| 3,965,857 | 6/1976 | Baxter | 118/405 |
| 4,036,043 | 7/1977 | Yamaguchi | 72/467 |
| 4,270,380 | 6/1981 | Gulati | 72/467 |
| 4,468,947 | 9/1984 | Takeda | 72/467 |

FOREIGN PATENT DOCUMENTS

| | | | |
|---|---|---|---|
| 13599 | 7/1980 | European Pat. Off. | 72/467 |
| 1211462 | 2/1966 | Fed. Rep. of Germany | |
| 1289497 | 2/1962 | France | |
| 54-17297 | 6/1979 | Japan | |
| 57-109519 | 7/1982 | Japan | 72/467 |

*Primary Examiner*—Nicholas P. Godici
*Assistant Examiner*—G. M. Reid
*Attorney, Agent, or Firm*—Sprung Horn Kramer & Woods

[57] ABSTRACT

There is disclosed a bushing for use in an apparatus for continuously passing a core wire through a crucible holding molten metal to accrete the molten metal on the core wire to form a cast rod. The bushing is connected to the crucible for passing the core wire therethrough into the crucible. The bushing is tubular and has an engaging portion for engaging with the core wire passing therethrough. The engaging portion is made of ceramics material containing a major proportion of at least one selected from the group consisting of zirconia, silicon carbide and silicon nitride.

3 Claims, 3 Drawing Figures

BUSHING IN CONTINUOUS CASTING DIP FORMING APPARATUS

This application is a continuation, of application Ser. No. 736,617, filed 5/21/85 now abandoned.

BACKGROUND OF THE INVENTION

1. Field of the Invention

This invention relates to a bushing or nozzle for use in a continuous casting dip forming apparatus of the type in which a core wire is continuously introduced into a crucible through a bushing, so that molten metal in the crucible is accreted on the moving core wire to form a cast rod having a clad resulting from the solidified accreted metal.

2. Prior Art

A conventional dip forming apparatus comprises a housing defining a chamber through which a core wire is passed, and a crucible for holding a molten metal disposed above the housing. The crucible has an inlet at its bottom for introducing the core wire into the bath of molten metal. Generally, a bushing or nozzle is connected at opposite ends thereof to an outlet of the housing and the inlet of the crucible, respectively, to introduce the core wire into the crucible from the housing. The bushing is rubbed at its inner surface by the core wire moving therethrough and is heated to elevated temperatures by the heat from the molten metal in the crucible. Therefore, the bushing must have good wear-resistance and thermal resistance. For this reason, the conventional bushing has heretofore been made of various wear-resistant and heat-resistant materials. Japanese Patent Application Laid-open (Kokai) No. 50-70236 discloses one such bushing made of a molybdenum-based alloy. However, such a busing has the following disadvantages:

(1) since the bushing is heated by the molten metal in the crucible to high temperatures, for example, of 1100° to 1200° C. in the case where the molten metal is copper, the crystal of molybdenum becomes greater (for example, on the order of several hundred micron meters) and is subjected to intercrystalline crack due to the abrasion between the bushing and the moving core wire. Fine fragments are produced from the bushing as a result of the intercrystalline crack, and such fragments tend to adhere to the core wire moving through the bushing. Such fine fragments are present in an interface between the core wire and clad of the resultant cast rod. When such a cast rod is drawn into a wire of a reduced diameter, the drawn wire is liable to be cut or severed, so that the drawing operation can not be carried out efficiently. It is considered that when a fragment or foreign matter having a size of one third of the diameter of the drawn wire is present in the wire, the drawn wire is subjected to a cut.

(2) The operation of the dip forming apparatus is sometimes stopped, and the crucible is removed from the apparatus. In this case, the busing is allowed to cool to room temperatures. During the temperature drop of the bushing, the bushing is subjected to oxidation because molybdenum has a relatively poor resistance to oxidation. As a result, the bushing is varied in shape and therefore can not be used again.

(3) In use, the bushing is subjected to undue wear and seizing at its inner surface due to a friction between the bushing and the moving core wire. Therefore, the bushing must be replaced by a new one. The service life of the molybdenum-based bushing in the continuous operation of the apparatus is a relatively short time of 30 to 80 hours.

SUMMARY OF THE INVENTION

With the above deficiencies of the prior art in view, it is an object of this invention to provide a bushing for use in a continuous casting dip forming apparatus which bushing will not produce fine fragments even at elevated temperatures, and will not be subjected to oxidation when cooled from elevated temperatures to room temperatures, and has a long service life.

According to the present invention, there is provided a bushing for use in an apparatus for continuously passing a core wire through a crucible holding molten metal to accrete the molten metal on the core wire to form a cast rod, the bushing being connected to the crucible for passing the core wire therethrough into the crucible, the bushing being tubular and having an engaging portion for engaging with the core wire passing therethrough, the engaging portion being made of ceramics material containing a major proportion of at least one selected from the group consisting of zirconia, silicon carbide and silicon nitride.

DESCRIPTION OF THE PREFERRED EMBODIMENTS OF THE INVENTION

Figure 1:
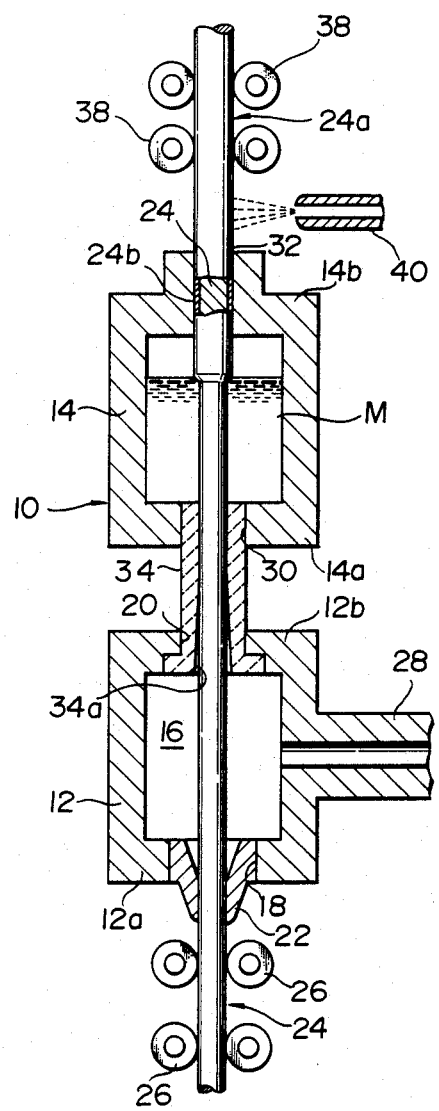
FIG. 1 is a cross-sectional view of a continuous casting dip forming apparatus incorporating a bushing provided in accordance with the present invention.

A continuous casting dip forming apparatus 10 shown in FIG. 1 comprises a vertically-disposed housing 12 and a crucible 14 disposed above the housing 12, the housing 12 defining a chamber 16. The elongated housing 12 has an inlet 18 and an outlet 20 formed in lower and upper end walls 12a and 12b thereof, respectively. Mounted in the inlet 18 of the housing 12 is a hollow shaving die 22 for removing a thin layer of metal from a core wire 24 to clean it, the core wire 24 being fed from a supply source (not shown) such as a reel into the housing chamber 16 by feed rolls 26. The housing 12 has a conduit 28 connectable to a vacuum source for creating a vacuum in the housing chamber 16. The crucible 14 holds molten metal M such as copper and has an inlet 30 and outlet 32 formed in lower and upper end walls 14a and 14b, respectively.

A tubular bushing or nozzle 34 is sealingly fitted in and secured to the outlet 20 of the housing 12 and the inlet 30 of the crucible 14 at opposite ends, respectively, so that the housing chamber 16 communicates with the crucible 14 via the bushing 34. The bushing 34 is disposed coaxially with the shaving die 22 and the outlet 32 of the crucible 14. The bushing 34 has an internal bore 34a of a circular cross-section tapering toward its upper end remote from the housing 12. The upper end portion of the bushing 34 which serves as an engaging portion is adapted to be in sliding contact with the core wire 24 at its inner surface and has an inner diameter slightly greater than the diameter of the core wire 24. The internal bore 34a may be of any cross-section such as square or other polygonal shapes.

The bushing 34 is made of ceramics material containing a major proportion of at least one selected from the group consisting of zirconia, silicon carbide and silicon nitride. Therefore, the bushing has excellent thermal resistance and wear resistance. Preferably, the bushing 34 is formed by compacting starting materials of fine powders having a particle size of about 0.5 μm to several μm into a densified solid body, and baking the densified solid body.

In operation, the housing chamber 16 is evacuated through the conduit 28. The core wire 24 is fed by the feed rolls 26 and is shaved by the shaving die 22, and the shaved core wire 24 is passed upwardly through the housing chamber 16 and is introduced into the bath of molten metal M in the crucible 14 through the bushing 34. The core wire 34 is further moved upwardly through the crucible 14, so that the molten metal M is accreted on the core wire 24 to form a cast rod 24a composed of the core wire 24 and a clad 24b composed of the accreted or deposited molten metal M around the core wire 24. The cast rod 24a is fed upwardly by take-up rolls 38 and is cooled by a spray of water fed from a spray nozzle 40 located adjacent to the outlet 32 of the crucible 14.

The core wire 24 is passed through the bushing 34 before it is introduced into the crucible 14, and therefore the inner surface of the bushing 34 defining the bore 34a is rubbed by the core wire 24 passing therethrough. The bushing 34 is made of the ceramics material having excellent heat resistance and wear resistance, and the bushing 34 and the core wire 24 passing therethrough provide a ceramics-to-metal contact, so that the inner surface of the bushing 34 is hardly subjected to wear and seizing. Therefore, the bushing 34 has a long service life.

As described above, the bushing 34 is composed of the powders having a particle size of about 0.5 μm to several μm. Therefore, even if part of the powder particles of such a small size are separated from the surface of the bore 34a of the bushing 34 and adhere to the surface of the core wire 24 due to the frictional contact therebetween, the cast rod 24a will not be cut or severed when it is drawn into a wire of a smaller diameter at a later stage. Further, the bushing 34 made of the ceramics material has an excellent resistance to oxidation, and therefore if the bushing 34 is cooled from elevated temperatures to room temperatures, the bushing 34 is subjected to little change in shape. Therefore, the bushing 34 can be repeatedly used properly even if subjected to such a substantial temperature drop.

This embodiment will now be illustrated by way of the following example:

EXAMPLE 1

About 91 mol. % of ZrO$_2$ powder, about 9 mol. % of MgO powder and a trace amount of compacting assistant were mixed together to form a power mixture. Then, the mixture was compacted into a densified solid body similar in shape to the bushing 34. Then, the densified body was baked to provide a bushing A composed of the zirconia-based ceramics.

A bushing B of silicon carbide-based ceramics containing not less than 98 mol. % of SiC and a bushing C of silicon nitride-based ceramics containing not less than 98 mol. % of Si$_3$N$_4$ were prepared according to the same procedure.

A comparative bushing D of molybdenum-based alloy was also prepared.

Each of the bushings A, B, C and D was used in the dip forming apparatus 10 of FIG. 1, and the apparatus was operated to determine its service life in the continuous operation, an amount of drawing of the cast rod, and the number of reuse. The core wire and the molten metal in the crucible were both oxygen-free copper. The amount (kg) of drawing of the cast rod implies how much the cast rod could be drawn on the average into a wire having diameter of 0.1 mm without being subjected to a cut or severance. The number of reuse was counted one each time the bushing, which was allowed to cool from elevated temperatures during the operation to room temperatures, could perform a proper function at the subsequent dip forming operation.

The results of the above test are shown in Table 1 below.

TABLE 1

| | Sample | | | |
|---|---|---|---|---|
| | A | B | C | D |
| Amount of drawing (kg) | 2400 | 2600 | 2200 | 600 |
| Service life (Hr) | 210 | 180 | 260 | 75 |
| Number of reuse | 3 | 2 | 4 | 0 |

As can be seen from Table 1, the bushings A, B and C according to the present invention exhibited much more excellent performance than the conventional bushing D. Thus, the bushings according to the present invention will transfer only a small amount of particles or fragments to the core wire passing therethrough, so that the drawn wire produced from the cast rod will not be cut or severed. In addition, these bushings can be reused and have a substantially longer service life.

A bushing of silica-based ceramics and a bushing of alumina-based ceramics were also prepared according to the above procedure and subjected to the above test, but they exhibited no good results. The reason is that the former has an affinity for molten copper and is susceptible to damage due to melting. And, the latter has a low thermal shock resistance.

Figure 2:
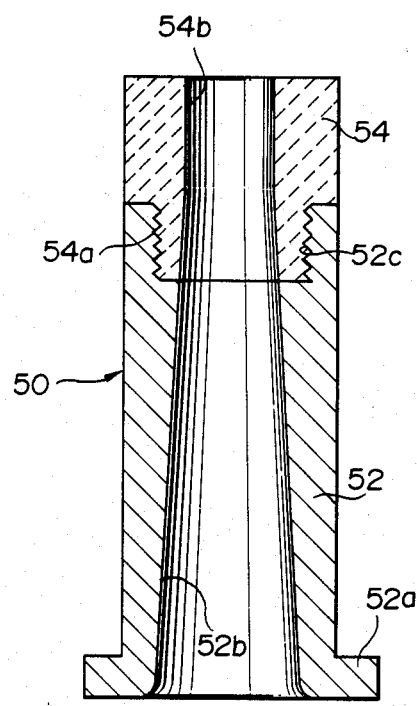
FIG. 2 is a cross-sectional view of a modified bushing.

FIG. 2 shows a modified bushing 50 which comprises a tubular body 52 of refractory metal having a peripheral flange 52a formed around a lower end thereof, and a tubular engaging member 54 secured to the upper end of the bushing 50 in coaxial relation thereto. The tubular body 52 has an internal bore 52b of a circular cross-section tapering toward the upper end thereof. The internal bore 52b has an internally-threaded portion 52c at its upper end. The engaging member 54 has an externally-threaded portion 54a formed in an outer surface at the lower end. The externally-threaded portion 54a of the engaging member 54 is screwed into the internally-threaded portion 52c of the tubular body 52.

The tubular engaging member 54 has an internal bore 54b of a circular cross-section, the internal bore 54b tapering from its lower end to a point intermediate the opposite ends thereof. That portion of the internal bore 54b extending from the intermediate point to the upper end has a uniform diameter and is adapted to be in sliding contact with the core wire 24 passing therethrough. The internal bore 52b of the tubular body 52 is smoothly continuous with the internal bore 54b of the contact member 54.

The engaging member 54 of the bushing 50 is made of the same ceramics material as described above for the bushing 34, that is to say, a ceramics material containing a major proportion of at least one selected from the group consisting of zirconia, silicon carbide and silicon nitride. Therefore, the engaging member 54 has excellent thermal resistance and wear resistance. The engaging member 54 is composed of powders having a particle size of about 0.5 μm to several μm as described above for the bushing 34, so that when the cast rod 24a is drawn into a wire of a smaller diameter, the wire will not be cut. In this embodiment, only the engaging member 54 is made of the ceramics material, and therefore the bushing 50 can be manufactured at lower costs. The ceramics material is somewhat brittle, and when an external force such as torsional and twisting forces is exerted on the bushing 50, most of such external force is resisted by the tubular body 52. Thus, the overall structure of the bushing 50 has a relatively high strength. The engaging member 54 can easily be removed from the tubular body 52 and replaced by a new one.

This embodiment will now be described by way of the following Example:

EXAMPLE 2

About 91 mol. % of $ZrO_2$ powder, about 9 mol. % of MgO powder and a trace amount of compacting assistant were mixed together to form a power mixture. Then, the mixture was compacted into a densified solid body similar in shape to the engaging member 54. Then, the densified body was baked to provide an engaging member Ea composed of the zirconia-based ceramics. An engaging member Fa of silicon carbide-based ceramics containing not less than 98 mol. % of SiC and a bushing Ga of silicon nitride-based ceramics containing not less than 98 mol. % of $Si_3N_4$ were prepared according to the same procedure.

The engaging members Ea, Fa and Ga were threadedly connected respectively to tubular bodies of metal similar in shape to the tubular body 52 to provide bushings E, F and G. A comparative bushing H of molybdenum-based alloy was also prepared.

Each of the bushings E, F, G and H was used in the dip forming apparatus 10 of FIG. 1, and the apparatus was operated to determine an amount of drawing of the cast rod, a service life of each bushing in the continuous operation, and the number of reuse, as described above in Example 1.

The results of the above test are shown in Table 2 below.

TABLE 2

| | Sample | | | |
|---|---|---|---|---|
| | E | F | G | H |
| Amount of drawing (kg) | 2000 | 2300 | 1900 | 600 |
| Service life (Hr) | 190 | 170 | 240 | 75 |
| Number of reuse | 2 | 1 | 3 | 0 |

As can be seen from Table 2, the bushings E, F and G according to the present invention exhibited much more excellent performance than the conventional bushing H. Thus, the bushings according to the present invention will transfer only a small amount of particles or fragments to the core wire passing therethrough, so that the drawn wire produced from the cast rod will not be cut or severed. In addition, these bushings can be reused and have a substantially longer service life.

A bushing having an engaging member of silica-based ceramics and a bushing having an engaging member of alumina-based ceramics were also prepared according to the above procedure and subjected to the above test, but they exhibited no good results for the same reasons given in the preceding embodiment.

Figure 3:
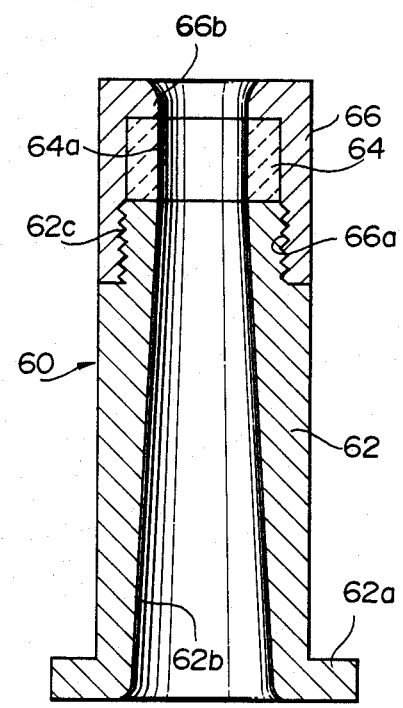
FIG. 3 is a view similar to FIG. 2 but showing another modified bushing.

FIG. 3 shows a modified bushing 60 which comprises a tubular body 62 of refractory metal having a peripheral flange 62a formed around a lower end thereof, and an annular engaging member 64, and a tubular retaining member 66 for holding the engaging member 64 with respect to the tubular body 62, these three members 62, 64 and 66 being disposed coaxially with one another. The tubular body 62 has an internal bore 62b of a circular cross-section tapering toward an upper end thereof. The tubular body 62 has an externally-threaded portion 62c formed in an outer peripheral surface at its upper end. The retaining member 66 made of a molybdenum-based alloy has an internally-threaded portion 66a formed in an inner peripheral surface thereof at its lower portion. The retaining member 66 has an inwardly-directed peripheral flange 66b at its upper end remote from the threaded portion 66a. The externally-threaded portion 62c of the tubular body 62 is screwed into the internally-threaded portion 66a of the retaining member 66. The engaging member 64 is snugly fitted in the retaining member 66, and the opposite ends of the engaging member 64 are held against the flange 66b of the retaining member 66 and the upper end of the tubular body 62, respectively, so that the engaging member 64 is held against movement. The engaging member 64 has an inner diameter slightly greater than the diameter of the core wire 24 passing therethrough. An internal bore 64a of the engaging member is smoothly continuous with the tapered internal bore 62b of the tubular body 62 and is adapted to be in sliding contact with the core wire 24 passing therethrough.

The engaging member 64 of the bushing 60 is made of the same ceramics material as described above for the bushing 34, that is to say, a ceramics material containing a major proportion of at least one selected from the group consisting of zirconia, silicon carbide and silicon nitride. Therefore, the engaging member 64 has excellent thermal resistance and wear resistance. The engaging member 64 is composed of powders having a particle size of about 0.5 μm to several μm as described above for the bushing 34, so that when the cast rod 24a is drawn into a wire of a smaller diameter, the wire will not be cut. The engaging member 64 can be easily replaced by a new one by removing the retaining member 66 from the tubular body 62.

According to the procedure in Example 2, there were prepared three sample engaging members 64 composed of zirconia-based ceramics material, silicon carbide-based ceramics material and silicon nitride-based ceramics. Each of the three engaging members 64 was joined together with the tubular body 62 and the retaining member 66 to provide a bushing 60. The three bushings 60 were subjected to the same test as described above in Example 2. The amount of drawing and the service life in the continuous operation achieved by each of the three bushings 60 were about 10% lower than those achieved by a corresponding one of the bushings E, F and G in Example 2. However, it will be appreciated that the three bushings 60 are much superior to the conventional bushing made of a molybdenum-based alloy.

What is claimed is:

1. An apparatus for continuously forming a cast rod comprising:
   (a) a crucible for holding a molten metal therein and having a bottom wall defining the bottom surface of the crucible;
   (b) a tubular bushing mounted in the bottom wall of said crucible; and
   (c) means for passing a core wire into and through said crucible through said bushing, thereby accreting said molten metal on said core wire, so that the accreted molten metal is solidified to form a clad around said core wire to form a cast rod, said bushing having a head portion for engaging with the core wire passing therethrough, said head portion having an internal bore therethrough for passing said core wire therethrough, a peripheral surface defining said internal bore being adapted for sliding contact with said core wire, and said head portion having one end disposed at the bottom surface of the crucible in contact with molten metal therein and said head portion is the only part of said bushing positioned so as to be able to come into contact with the molten metal, further said head portion being made of ceramic material containing a major proportion of at least one selected from the group consisting of zirconia, silicon carbide and silicon nitride, whereby the bushing is not corroded by the molten metal, wherein said bushing comprises a tubular body and a tubular engaging member threadably connected to one end of said tubular body in coaxial relation thereto, said engaging member serving as said head portion and being made of said ceramic material, said tubular body having an internal bore coaxial with the bore of said engaging member and smoothly continuous therewith.

2. The apparatus according to claim 1, wherein said internal bore of said engaging portion is generally smoothly tapered from one end toward the other.

3. The apparatus according to claim 1, wherein the bushing is made entirely of said ceramic material.

* * * * *